United States Patent
Wright et al.

(10) Patent No.: US 7,262,248 B2
(45) Date of Patent: Aug. 28, 2007

(54) ARTICLES PREPARED FROM HIGH MOLECULAR WEIGHT TETRABLOCK COPOLYMERS

(75) Inventors: Kathryn J. Wright, Katy, TX (US); Sharman K. McGilbert, Houston, TX (US)

(73) Assignee: Kraton Polymers U.S. LLC, Houston, TX (US)

( * ) Notice: Subject to any disclaimer, the term of this patent is extended or adjusted under 35 U.S.C. 154(b) by 0 days.

(21) Appl. No.: 10/843,125

(22) Filed: May 11, 2004

(65) Prior Publication Data

US 2005/0256265 A1    Nov. 17, 2005

(51) Int. Cl.
*C08L 51/00* (2006.01)
*C08L 53/02* (2006.01)

(52) U.S. Cl. .......................... 525/71; 525/89; 525/98; 525/99

(58) Field of Classification Search .................. 525/89, 525/98, 71, 99
See application file for complete search history.

(56) References Cited

U.S. PATENT DOCUMENTS

| | | | |
|---|---|---|---|
| 3,149,182 A | 9/1964 | Porter | |
| 3,231,635 A | 1/1966 | Holden et al. | |
| 3,238,173 A | 3/1966 | Bailey et al. | |
| 3,239,478 A | 3/1966 | Harlan | |
| 3,265,765 A | 8/1966 | Holden et al. | |
| 3,431,323 A | 3/1969 | Jones | |
| RE27,145 E | 6/1971 | Jones | |
| 4,107,131 A | 8/1978 | Gergen et al. | |
| 4,418,180 A * | 11/1983 | Heinz et al. | 525/314 |
| 5,627,235 A | 5/1997 | Himes | |

FOREIGN PATENT DOCUMENTS

| EP | 1 348 737 A1 | 10/2003 |
|---|---|---|
| EP | 1 431 364 A1 | 6/2004 |
| WO | 00/56796 A1 | 9/2000 |

\* cited by examiner

*Primary Examiner*—Jeffrey Mullis
(74) *Attorney, Agent, or Firm*—Dean F. Vance; Donna B. Holgun

(57) ABSTRACT

The present invention relates to articles prepared from novel anionic block copolymers of mono vinyl aromatics and conjugated dienes, and to blends of such block copolymers with other polymers. The block copolymer may be blended with at least one other polymer selected from the group consisting of olefin polymers, styrene polymers, amorphous resins and engineering thermoplastic resins.

34 Claims, No Drawings

ARTICLES PREPARED FROM HIGH MOLECULAR WEIGHT TETRABLOCK COPOLYMERS

BACKGROUND OF THE INVENTION

1. Field of the Invention

This invention relates to articles prepared from novel anionic block copolymers of aromatic vinyl compounds and conjugated dienes, and to blends of such block copolymers with other polymers. The invention also relates to formed articles and methods for forming articles from such novel block copolymers.

2. Background of the Art

The preparation of block copolymers of mono alkenyl arenes and conjugated dienes is well known. One of the first patents on linear ABA block copolymers made with styrene and butadiene is U.S. Pat. 3,149,182. Over the last forty plus years a large number of new styrene diene polymers have been developed. Such polymers include linear polymers, radial polymers, asymmetric polymers, hydrogenated polymers, functionalized polymers and the like. In most cases the polymer was developed to meet an important customer need that was not currently being met. This has been a very dynamic process, and has resulted in enormous growth for new styrene/diene block copolymers and new uses to meet consumer demands.

Even with the growth of many new polymers, there still are consumer demands that go unfulfilled. For example, it has long been desired to have a polymer with high molecular weight in conjunction with easy processability. High molecular weight polystyrene blocks are often necessary to achieve good high temperature performance particularly in automotive applications. In order to maintain a constant polystyrene content, an increase in the polystyrene block molecular weights forces an increase in the total polymer molecular weight. This leads to very high viscosities and often intractable flow. In order to achieve the high molecular weights desired, at acceptable processing conditions, a new polymer has been discovered. This new polymer is an A1-B1-A2-B2 tetrablock copolymer, having particular molecular weights and structure. What has now been found is that blends or compounds of these novel tetrablock copolymers with processing oils and other polymers have surprising property advantages, and show promising utility in a variety of end-use applications, including injection molding, extruded goods and polymer modification. The polymers of the present invention allow for improved processability at high molecular weights analogous to those of block copolymers currently available in the market. This is observed through improvements in compound melt flow without a reduction in properties at elevated temperature.

SUMMARY OF THE INVENTION

In one aspect of the present invention we have discovered that a novel composition comprising an S1-B1-S2-B2 tetrablock copolymer and another component, has superior properties for many applications. We have also discovered that these compositions can be used in various forming processes, and that they also have a number of advantages in processing. Accordingly, the broad aspect of the present invention is an article comprising the novel S1-B1-S2-B2 tetrablock copolymer and at least one other component selected from the group consisting of olefin polymers, styrene polymers, tackifying resins, polymer extending oils and engineering thermoplastic resins, wherein S1, B 1, S2, and B2 are polymer blocks, and B1 is a block of polymerized conjugated diene comprising at least 50 mole percent isoprene having an apparent molecular weight of from about 150,000 to about 400,000; S1 and S2 are blocks of polymerized monovinyl aromatic hydrocarbon having a weight average molecular weight of about 12,000 to about 40,000; and B2 is a block of polymerized conjugated diene comprising at least 50 mole percent isoprene having an apparent molecular weight of from about 15,000 to about 60,000; and wherein the content of polymerized monovinyl aromatic hydrocarbon is from about 10 to about 35 weight percent.

In another aspect of the present invention we have shown that the article can be formed in a wide variety of processes, including injection molding, compression molding, over molding, dipping, extrusion, roto molding, slush molding, fiber spinning, blow molding, polymer modification, cast film making, blown film making and foaming.

In yet another aspect of the present invention, the article can be processed into the form of a film, sheet, multi layer laminate, coating, band, strip, profile, molding, foam, tape, fabric, thread, filament, ribbon, fiber, plurality of fibers, or fibrous web.

Finally, the copolymers of the present invention can be compounded with other components not adversely affecting the copolymer properties. Exemplary materials that could be used as additional components would include, without limitation, pigments, antioxidants, stabilizers, surfactants, waxes, and flow promoters. The polymers of the present invention are useful in a wide variety of applications including, for example, molded and extruded goods such as toys, grips, handles, shoe soles, tubing, sporting goods, sealants, gaskets, and oil gels. The compositions also find use as rubber toughening agents for polyolefins, polystyrene, polyurethane, polyester, polycarbonate and epoxy resins. The polymers of the present invention are also useful in alloys and blends, and as compatibilizers for a variety of polymers and other materials.

DETAILED DESCRIPTION OF THE PREFERRED EMBODIMENTS

The key component of the present invention is the novel tetrablock copolymer. As used herein the tetrablock copolymer has the general formula:

S1-B1-S2-B2 wherein S1, B1, S2, and B2 are polymer blocks, and B1 is a block of polymerized conjugated diene comprising at least 50 mole percent isoprene having an apparent molecular weight of from about 150,000 to about 400,000; S1 and S2 are blocks of polymerized monovinyl aromatic hydrocarbon having a weight average molecular weight of about 12,000 to about 40,000; and B2 is a block of polymerized conjugated diene comprising at least 50 mole percent isoprene having an apparent molecular weight of from about 15,000 to about 60,000. For the purposes of the present invention, molecular weights were measured with gel permeation chromatography (GPC) using polystyrene polymers of known molecular weight as calibration standards according to ASTM D3536. Thus, one measures S1 and S2 as weight average molecular weights because they are polystyrene polymers. The term "apparent molecular weight" is used throughout the application for B1 and B2 since they are molecular weight of a polystyrene polymer which elutes from the GPC column at the same time as B1 and B2.

While isoprene is the preferred conjugated diene for preparing the block copolymer component of the compounds and blends of the present invention, other suitable conjugated dienes can also be used. For example, 1,3-butadiene, 2,3-dimethyl-1,3-butadiene, 1,3-pentadiene, 1,3-hexadiene and others conjugated dienes having from 4 to 8 carbon atoms can also be used with the present invention. Mixtures of such dienes with isoprene may also be used. Preferably, the blocks of conjugated diene comprise at least 50 mole percent, preferable at least about 80 mole percent, and most preferably, at least 99 mole percent isoprene.

Similarly, styrene is the preferred monovinyl aromatic hydrocarbon to prepare the A1 and A2 blocks of the present invention, but other monovinyl aromatic hydrocarbons can also be used. For example, other monovinyl aromatic hydrocarbons useful with the present invention include o-methylstyrene, p-methylstyrene, p-tert-butylstyrene, 2,4-dimethylstyrene, α-methylstyrene, vinyl naphthalene, vinyl toluene and vinyl xylene, or mixtures thereof. Preferably the blocks of polymerized monovinyl aromatic hydrocarbon are made of styrene or a mixture comprising at least 80 mole percent styrene, the former being preferred. Most preferably, the blocks of polymerized monovinyl aromatic hydrocarbon are made of styrene or a mixture comprising at least 99 mole percent styrene.

The block copolymers useful with the present invention are preferably poly(styrene-isoprene-styrene-isoprene) polymers. To achieve the properties important to preparing the compounds and blends of the present invention, the block copolymer must have the structural and molecular weight limitations as set out above. Thus, B1 has an apparent molecular weight of from about 150,000 to about 400,000. Preferably, B1 has an apparent molecular weight of from about 250,000 to about 350,000. In like manner, B2 has an apparent molecular weight of from about 15,000 to about 60,000, preferably from about 25,000 to about 50,000; and S1 and S2 each independently have a weight average molecular weight of from about 12,000 to about 40,000, preferably from about 20,000 to 35,000.

In the practice of the present invention, according to the general formula, the block copolymers used to prepare the blends and compounds of the present invention have a B1 block with a greater apparent molecular weight than the B2 block. The weight ratio "W" of B1 over B2 is from about 3.0 to about 12.0, preferably from about 4.0 to about 8.0. Most preferably, W is about 6.0.

The block copolymers of the present invention have a greater weight content of conjugated diene than monovinyl aromatic hydrocarbon. The content of polymerized monovinyl aromatic hydrocarbon in the block copolymers is from about 15 to about 30 weight percent. More preferably, the content of polymerized monovinyl aromatic hydrocarbon in the block copolymers used to prepare the blends and compounds of the present invention is from 20 to 25 weight percent.

The block copolymers useful with the present invention are preferably prepared by anionic polymerization. The preparation of these block copolymers is well known to those skilled in the art and has been described in U.S. Pat. Nos. 3,265,765; 3,231,635; 3,149,182; 3,238,173; 3,239,478; 3,431,323; Re. 27,145. The novel tetrablock is disclosed in EP 1,348,737 A1. Typically the polymerization is carried out in a hydrocarbon solvent, such as cyclohexane, using an alkyl lithium initiator, such as sec-butyl lithium. The polymers are preferably prepared by the sequential polymerization method in which each polymer block is prepared by sequential addition of each monomer to the reactor. Any block copolymer having the above described structure and molecular weights can be used with the present invention.

Another aspect of the present invention relates to the microstructure or vinyl content of the conjugated diene in the B blocks. The term "vinyl content" refers to the fact that a conjugated diene is polymerized via 1,2-addition (in the case of butadiene—it would be 3,4-addition in the case of isoprene). Although a pure "vinyl" group is formed only in the case of 1,2-addition polymerization of 1,3-butadiene, the effects of 3,4-addition polymerization of isoprene (and similar addition for other conjugated dienes) on the final properties of the block copolymer will be similar. The term "vinyl" refers to the presence of a pendant vinyl group on the polymer chain. When referring to the use of isoprene as the conjugated diene, it is preferred that about 5 to about 80 mol percent of the condensed isoprene units in the copolymer block have 3,4 vinyl configuration as determined by proton NMR analysis, more preferably 5 to 20 mol percent. This is effectively controlled by varying the relative amount of the ether or microstructure agent. Suitable ratios of microstructure agent to lithium are disclosed and taught in U.S. Pat. No. Re 27,145, which disclosure is incorporated by reference.

Compositions of the present invention can be prepared via combination of the block copolymer and polymer extending oil. Especially preferred are the types of oil that are compatible with the elastomeric segment of the block copolymer. While oils of higher aromatics content are satisfactory, those petroleum-based white oils having low volatility and less than 50% aromatic content are preferred. Typical paraffinic and naphthenic extending oils can be used to soften and extend polymers of the present invention. Polymer extending oils with an aromatic content less than 10% are preferred. The oils should additionally have low volatility, preferable having an initial boiling point above 425° F. The amount of oil employed varies from about 0 to about 300 parts by weight per hundred parts by weight rubber, or tetrablock copolymer, preferably about 20 to about 150 parts by weight.

The tetrablock copolymers of the present invention may be blended with a large variety of other polymers, including olefin polymers, styrene polymers, tackifying resins, and engineering thermoplastic resins.

In addition, the novel tetrablock copolymers of the present invention maybe blended with conventional styrene/diene and hydrogenated styrene/diene block copolymers, such as the block copolymers available from KRATON Polymers. These block copolymers include linear S-B-S, S-I-S, S-EB-S, S-EP-S block copolymers. Also included are radial block copolymers based on styrene along with isoprene and/or butadiene and selectively hydrogenated radial block copolymers.

Olefin polymers include, for example, ethylene homopolymers, ethylene/alpha-olefin copolymers, propylene homopolymers, propylene/alpha-olefin copolymers, high impact polypropylene, butylene homopolymers, butylene/alpha olefin copolymers, and other alpha olefin copolymers or interpolymers. Representative polyolefins include, for example, but are not limited to, substantially linear ethylene polymers, homogeneously branched linear ethylene polymers, heterogeneously branched linear ethylene polymers, including linear low density polyethylene (LL-DPE), ultra or very low density polyethylene (ULDPE or VLDPE), medium density polyethylene (MDPE), high density polyethylene (HDPE) and high pressure low density polyethylene (LDPE). Other polymers included hereunder are ethylene/acrylic acid (EEA) copolymers, ethylene/methacrylic acid (EMAA) ionomers, ethylene/vinyl acetate (EVA) copolymers, ethylene/vinyl alcohol (EVOH) copolymers, ethylene/cyclic olefin copolymers, polypropylene homopolymers and copolymers, propylene/styrene copolymers, ethylene/propylene copolymers, polybutylene, ethylene carbon monoxide interpolymers (for example, ethylene/carbon monoxide (ECO) copolymer, ethylene/acrylic acid/carbon monoxide terpolymer and the like.

Styrene polymers include, for example, crystal polystyrene, high impact polystyrene, medium impact polystyrene, styrene/acrylonitrile copolymers, styrene/acrylonitrile/butadiene (ABS) polymers, syndiotactic polystyrene, styrene/methyl-methacrylate copolymers and styrene/olefin copolymers. Representative styrene/olefin copolymers are substantially random ethylene/styrene copolymers, preferably containing at least 10, more preferably equal to or greater than 25 weight percent copolymerized styrene monomer. Also included are styrene-grafted polypropylene polymers, such as those offered under the tradename Interloy® polymers, originally developed by Himont, Inc. (now Basell).

For the purposes of the specification and claims, the term "engineering thermoplastic resin" encompasses the various polymers found in the classes listed in Table A below, and further defined in U.S. Pat. No. 4,107,131, the disclosure of which is hereby incorporated by reference.

TABLE A

| | |
|---|---|
| 1. | Thermoplastic Polyester |
| 2. | Thermoplastic Polyurethane |
| 3. | Poly(aryl ether) and Poly(aryl sulfone) |
| 4. | Polycarbonate |
| 5. | Acetal resin |
| 6. | Polyamide |
| 7. | Halogenated thermoplastic |
| 8. | Nitrile barrier resin |
| 9. | Poly(methyl methacrylate) |

Tackifying resins include polystyrene block compatible resins and midblock compatible resins. The polystyrene block compatible resin maybe selected from the group of coumarone-indene resin, polyindene resin, poly(methyl indene) resin, polystyrene resin, vinyltoluene-alphamethylstyrene resin, alphamethylstyrene resin and polyphenylene ether, in particular poly(2,6-dimethyl-1,4-phenylene ether). Such resins are e.g. sold under the trademarks "HERCURES", "ENDEX", "KRISTALEX", "NEVCHEM" and "PICCOTEX". Resins compatible with the (mid) block may be selected from the group consisting of compatible $C_5$ hydrocarbon resins, hydrogenated $C_5$ hydrocarbon resins, styrenated $C_5$ resins, $C_5/C_9$ resins, styrenated terpene resins, fully hydrogenated or partially hydrogenated $C_9$ hydrocarbon resins, rosins esters, rosins derivatives and mixtures thereof. These resins are e.g. sold under the trademarks "REGALITE", "REGALREZ", "ESCOREZ" and "ARKON".

The polymer blends of the present invention may be compounded further with other polymers, oils, fillers, reinforcements, antioxidants, stabilizers, fire retardants, anti-blocking agents, lubricants and other rubber and plastic compounding ingredients without departing from the scope of this invention.

Inorganic fillers can be used for reinforcement and/or cost reduction purposes. Examples of various fillers that can be employed are found in the 1971-1972 Modem Plastics Encyclopedia, pages 240-247. Reinforcement may be defined simply as the material that is added to a resinous matrix to improve the strength of the polymer. Most of these reinforcing materials are inorganic or organic products of high molecular weight. Various examples include glass fibers, asbestos, boron fibers, talc, carbon and graphite fibers, barium sulfate, whiskers, quartz and silica fibers, ceramic fibers, metal fibers, natural organic fibers, and synthetic organic fibers. Especially preferred are reinforced polymer blends of the instant invention containing less than about 60 percent by weight inorganic filler, based on the total weight of the resulting reinforced blend. A preferred formulation for a sound and vibration dampening compound for automotive and industrial applications comprises 5 to 20 percent by weight of the novel tetrablock; 5 to 20 percent by weight of a polymer extending oil; 10 to 40 percent by weight of a propylene homo polymer or copolymer; and 10 to 60 percent by weight of barium sulfate. Coupling or sizing agents, such as various silanes, may also be employed in the preparation of the reinforced blends.

Regarding the relative amounts of the various ingredients, this will depend in part upon the particular end use and on the particular block copolymer that is selected for the particular end use. Table B below shows some notional compositions expressed in percent weight, which are included in the present invention. For the "Polymer" amount, a portion may include conventional styrene block copolymers:

TABLE B

| Applications, Compositions and Ranges | | |
|---|---|---|
| Application | Ingredients | Composition % w. |
| Films, Molding, Alloys | Polymer | 1-99% |
| | Ethylene copolymers: EVA, Ethylene/styrene | 99-1% |
| Injection Molded articles | Polymer | 10-100% |
| | Polyolefin | 0-50% |
| | PS | 0-50% |
| | Oil | 0-60% |
| Injection molded/extrusion | Polymer | 10-90% |
| | PPO | 0-50% |
| | PS | 0-50% |
| | Engineering Plastic | 0-50% |
| | Filler | 0-60% |
| | Oil | 0-60% |

TABLE B-continued

Applications, Compositions and Ranges

| Application | Ingredients | Composition % w. |
|---|---|---|
| Cap Seals | Polymer | 25-90% |
|  | Oil and/or Tackifying Resin | 0-50% |
|  | PP | 0-50% |
|  | Filler | 0-25% |
|  | Lubricant | 0 to 3% |
| Engineering Thermoplastic toughening | Polymer or Maleated Polymer | 5-30% |
|  | Engineering thermoplastic, e.g. Nylon 6,6, TPU | 70-95% |
| Dipped Goods | Polymer | 60-100% |
|  | Plasticizer, oil | 0-40% |
| Polymer Modification | Polymer | 5-95% |
|  | ABS, PS, HIPS, PE | 95-5% |

The polymer of the present invention maybe used in a large number of applications, either as a neat polymer or in a compound. The following various end uses and/or processes are meant to be illustrative, and not limiting to the present invention:
Polymer modification applications
Injection molding of toys, medical devices
Extruding films, tubing, profiles
Over molding applications for personal care, grips, soft touch applications, for automotive parts, such as airbags, steering wheels, etc
Dipped goods, such as gloves
Thermoset applications, such as in sheet molding compounds or bulk molding compounds for trays
Roto molding for toys and other articles
Slush molding of automotive skins
Thermal spraying for coatings
Blown film for medical devices
Blow molding for automotive/industrial parts.
Elastic films and fibers

EXAMPLES

The following examples are provided to illustrate the present invention. The examples are not intended to limit the scope of the present invention and they should not be so interpreted. Amounts are in parts by weight per hundred parts by weight rubber unless otherwise indicated.

Example 1

When good compression set performance is required, high molecular weight SEBS block copolymers are often the only polymer type available to meet the performance criteria. However, SEBS block copolymers have the disadvantage of difficult processability. High molecular weight tetrablock SISI block copolymers of the present invention offer advantages over existing SIS block copolymers when compounded to achieve good compression set performance. In addition the compounds are easier to process and have a lower viscosity than traditional compounds containing high molecular weight SEBS block copolymers. In this example two compounds containing a high molecular weight SISI tetrablock copolymer are compared to a traditional S-EB-S compound formulation containing a high molecular weight SEBS polymer (CP 1). All formulations were compounded on a twin screw extruder and then injection molded. Formulation 1-1 exhibits an identical compression set performance to the reference SEBS formulation 1-3 with a higher melt flow index. In addition the compound is 20 Shore A points softer which is also a desirable attribute. Formulation 1-2 shows the influence of a traditional SIS block copolymer on compression set. While the hardness remains relatively unchanged and processability improves, compression set performance suffers as indicated by an increase of 20%.

| Formulation | 1-1 | 1-2 | 1-3 |
|---|---|---|---|
| SISI tetrablock #1 | 100 | 50 |  |
| SIS triblock #1 |  | 50 |  |
| PE (Attane 4201) | 40 | 40 |  |
| Drakeol 34 | 110 | 110 |  |
| CP #1 |  |  | 100 |
| PP (5A15H) |  |  | 40 |
| Drakeol 34 |  |  | 110 |
| Irganox 1010 | 0.5 | 0.5 | 0.5 |
| Hardness, 10s (A) | 36 | 32 | 58 |
| Tensile Properties MD |  |  |  |
| Tensile Strength (PSI) | 320 | 335 | 1330 |
| Elongation (%) | 610 | 675 | 840 |
| 100% modulus (PSI) | 115 | 110 | 250 |
| 300% modulus (PSI) | 190 | 180 | 370 |
| Tear strength (PLI) | 78 | 84 | 160 |
| Compression set (%) | 44 | 63 | 44 |
| Melt flow (g/10 min) | 45 | 131 | 17 |
| MF Condition | 230 C./5 kg | 200 C./5 kg | 230 C./5 kg |

In Example 1, Attane 4201 is a 1 MF ultra low density polyethylene, Drakeol 34 is paraffinic polymer extending oil, and 5A15H is a polypropylene homopolymer having a 5 melt flow. Block copolymer SISI#1 is a styrene-isoprene-styrene-isoprene block copolymer having the following characteristics: molecular weight ((400,000): S1=28,000, B1=247,000, S2=28,000, B2=40,000, polystyrene content=22 percent, W=6.2. SIS tribloc #1 has a molecular weight of 128,000 and a polystyrene content of 30%. And CP #1 is a selectively hydrogenated styrene-butadiene-styrene block copolymer (an SEBS block copolymer) having a molecular weight of 280,000 and a polystyrene content of 33%.

Example 2

This example demonstrates the advantage for high molecular weight tetrablock SISI block copolymers of the present invention over high molecular weight radial SBS block copolymers in highly filled compounds. When SISI #1 is directly substituted for CP #2, marked improvements in melt flow and elongation to break are observed while hardness, tear strength, tensile strength, and compression set are relatively unaffected.

| Formulation | 2-1 | 2-2 |
|---|---|---|
| CP #2 | 22 | |
| SISI #1 | | 22 |
| Ergon L2000 | 22 | 22 |
| PP 5E63 | 62 | 62 |
| BaSO$_4$ | 105 | 105 |
| Crodamide OR | 0.5 | 0.5 |
| Ethanox 330 | 0.2 | 0.2 |
| Zinc Stearate | 1.7 | 1.7 |
| Hardness, 10s (A) | 91 | 91 |
| Tensile Properties MD | | |
| Tensile Strength (PSI) | 1175 | 1160 |
| Elongation (%) | 70 | 125 |
| Tear strength (PLI) | 305 | 310 |
| Compression set (%) 70° C./22 hours | 87 | 86 |
| Melt flow (g/10 min) 235° C./5 kg | 56 | 181 |

In Example 2 the conventional radial styrenic block copolymer CP #2 has the structure (S-B)$_n$X, and is prepared by coupling with dimethyl adipate. CP #2 has on average between about 3 and 4 arms. In the conventional block copolymer CP #2 the S block has a mol weight of about 21,000 and the GPC peak molecular weight of the polymer is about 425,000, with a styrene content of 30% by weight. Ergon L2000 is a naphthenic polymer extending oil. PP 5E63 is a 12 MF polypropylene homopolymer.

What is claimed is:

1. An article comprising:
   A. a tetrablock copolymer and
   B. at least one other polymer selected from the group consisting of:
      i) olefin polymers, and
      ii) styrene polymers,
   C. and optionally, one or more components selected from:
      i) tackifying resins,
      ii) polymer extending oils, and
      iii) engineering thermoplastic resins,
   wherein said tetrablock copolymer has the general formula: S1-B1-S2-B2 wherein S1, B1, S2, and B2 are polymer blocks, and
   a. B1 is a block of polymerized conjugated diene comprising at least 50 mole percent isoprene having an apparent molecular weight of from about 150,000 to about 400,000;
   b. S1 and S2 are blocks of polymerized monovinyl aromatic hydrocarbon having a weight average molecular weight of about 12,000 to about 40,000;
   c. B2 is a block of polymerized conjugated diene comprising at least 50 mole percent isoprene having an apparent molecular weight of from about 15,000 to about 60,000; and wherein;
   d. the weight ratio of B1 over B2 is from about 3.0 to about 12.0 and
   e. the content of polymerized monovinyl aromatic hydrocarbon is from 20 to about 35 weight percent;
with the proviso that when olefin polymers are present, the article comprises 100 parts by weight of said tetrablock copolymer and from about 5 to about 300 parts by weight of at least one olefin polymer selected from the group consisting of ethylene homopolymers, ethylene/alpha olefin copolymers, propylene homopolymers, propylene/alpha olefin copolymers, high impact polypropylene, butylene homopolymers, butylene/alpha olefin copolymers, other alpha olefin copolymers or interpolymers ethylene/acrylic acid copolymers, ethylene/methacrylic acid ionomers, ethylene/vinyl alcohol copolymers, ethylene/cyclic olefin copolymers, propylene homopolymers and copolymers, propylene/syrene copolymers, ethylene/propylene copolymers, polybutylene, ethylene carbon monoxide interpolymers, and ethylene/vinyl acetate copolymers;
and with the further proviso that when styrene polymers are present, the article comprises 100 parts by weight of said tetrablock copolymer and from about 5 to about 200 parts by weight of at least one styrene polymer selected from the group consisting of crystal polystyrene, high impact polystyrene, medium impact polystyrene, styrene/acrylonitrile copolymers, syndiotactic polystyrene, styrene/methyl-methacrylate copolymers, styrene/olefin copolymers selected from the group consisting of substantially random ethylene/styrene copolymers and styrene-grafted polypropylene polymers, and acrylonitrile/butadiene/styrene terpolymer.

2. The article according to claim 1 wherein said monovinyl aromatic hydrocarbon is styrene and said conjugated diene is selected from the group consisting of isoprene and butadiene.

3. The article according to claim 2 wherein said conjugated diene is isoprene, and wherein about 5 to about 80 mol percent of the condensed isoprene units in block B have 3,4-configuration.

4. The article according to claim 3 wherein said B1 and B2 blocks are polymerized isoprene blocks having greater than 80 mol percent isoprene and apparent molecular weights of 250,000 to 350,000 for B1 and 25,000 to 50,000 for B2.

5. The article according to claim 4 wherein said S1 and S2 blocks are polymerized styrene blocks having greater than 80 mol percent styrene and apparent molecular weights of 20,000 to 35,000 for S1 and 20,000 to 35,000 for S2.

6. The article according to claim 2 wherein said S1 and S2 blocks are polymerized styrene blocks having greater than 99 mol percent styrene and apparent molecular weights of 20,000 to 35,000 for S1 and 20,000 to 35,000 for S2 and said B1 and B2 blocks are polymerized isoprene blocks having greater than 99 mol percent isoprene and apparent molecular weights of 250,000 to 350,000 for B1 and 25,000 to 50,000 for B2.

7. The article according to claim 6 wherein the 3,4-configuration is between 5 mol percent and 20 mol percent.

8. The article according to claim 7 wherein the article comprises 100 parts by weight of said tetrablock copolymer and from about 5 to about 200 parts by weight of a styrene polymer.

9. The article according to claim 1 wherein the article comprises 100 parts by weight of said tetrablock copolymer and from about 5 to about 300 parts by weight of an olefin polymer selected from the group consisting of ethylene homopolymers, ethylene/alpha olefin copolymers, propylene homopolymers, propylene/alpha olefin copolymers, high impact polypropylene, butylene homopolymers, butylene/alpha olefin copolymers, other alpha olefin copolymers or interpolymers ethylene/acrylic acid copolymers, ethylene/methacrylic acid ionomers, ethylene/vinyl alcohol copolymers, ethylene/cyclic olefin copolymers, propylene homopolymers and copolymers, propylene/syrene copolymers, ethylene/propylene copolymers, polybutylene, ethylene carbon monoxide interpolymers and ethylene/vinyl acetate copolymers.

10. The article according to claim 9 also comprising about 5 to about 50 parts by weight of a tackifying resin.

11. The article according to claim 9, further comprising from about 5 to about 300 parts by weight of a polymer extending oil.

12. The article according to claim 1 wherein the article comprises 100 parts by weight of said tetrablock copolymer and from about 5 to about 200 parts by weight of a styrene polymer.

13. The article according to claim 12 also comprising about 5 to about 50 parts by weight of a tackifying resin.

14. The article according to claim 12, further comprising from about 5 to about 300 parts by weight of a polymer extending oil.

15. The article according to claim 1 wherein the articles is in the form of a film, sheet, coating, band, strip, profile, molding, foam, tape, fabric, thread, filament, ribbon, fiber, plurality of fibers or, fibrous web.

16. The article according to claim 1 wherein said article is formed in a process selected from the group consisting of injection molding, over molding, dipping, extrusion, roto molding, slush molding, fiber spinning, film making or foaming.

17. The article according to claim 1 also comprising an SBS or SIS copolymer.

18. The article according to claim 1 in the form of a film.

19. The article according to claim 1 in the form of a fiber.

20. The article according to claim 1 in the form of an elongated tube.

21. The article according to claim 1 in the form of a sheet.

22. A cap seal formed from a formulated composition comprising a tetrablock copolymer and at least one component selected from the group consisting of fillers, reinforcements, polymer extending oils, tackifying resins, lubricants, polyolefins, and styrene polymers wherein said tetrablock copolymer has the general formula: S1-B1-S2-B2 wherein S1, B1, S2, and B2 are polymer blocks, and
   a. B1 is a block of polymerized conjugated diene comprising at least 50 mole percent isoprene having an apparent molecular weight of from about 150,000 to about 400,000;
   b. S1 and S2 are blocks of polymerized monovinyl aromatic hydrocarbon having a weight average molecular weight of about 12,000 to about 40,000;
   c. B2 is a block of polymerized conjugated diene comprising at least 50 mole percent isoprene having an apparent molecular weight of from about 15,000 to about 60,000; and wherein;
   d. the weight ratio of B1 over B2 is from about 3.0 to about 12.0 and
   e. the content of polymerized monovinyl aromatic hydrocarbon is from 20 to about 35 weight percent.

23. An article comprising
   A. 5 to 20 percent by weight of a tetrablock copolymer;
   B. 5 to 20 percent by weight of a polymer extending oil;
   C. 10 to 40 percent by weight of a propylene homo polymer or copolymer; and
   D. 10 to 60 percent by weight of barium sulfate;
wherein said tetrablock copolymer has the general formula: S1-B1-S2-B2 wherein S1, B1, S2, and B2 are polymer blocks, and
   a. B1 is a block of polymerized isoprene having greater than 99 mol percent isoprene and having an apparent molecular weight of from about 250,000 to 350,000;
   b. S1 and S2 are blocks of polymerized styrene blocks having greater than 99 mol percent styrene and apparent molecular weights of 20,000 to 35,000 for S1 and 20,000 to 35,000 for S2;
   c. B2 is a block of polymerized isoprene having greater than 99 mol percent isoprene and having an apparent molecular weight of from about 25,000 to about 50,000; and wherein;
   d. the weight ratio of B1 over B2 is from about 3.0 to about 12.0;
   e. the 3,4-configuration is between 5 mol percent and 20 mol percent; and
   f. the content of polymerized styrene is from about 10 to about 35 weight percent.

24. The article according to claim 23 for use as a vibration-deadening sheet.

25. A film formed from a formulated composition comprising a tetrablock copolymer and at least one component selected from the group consisting of fillers, reinforcements, polymer extending oils, tackifying resins, lubricants, polyolefins, and styrene polymers wherein said tetrablock copolymer has the general formula: S1-B1-S2-B2 wherein S1, B1, S2, and B2 are polymer blocks, and
   a. B1 is a block of polymerized conjugated diene comprising at least 50 mole percent isoprene having an apparent molecular weight of from about 150,000 to about 400,000;
   b. S1 and S2 are blocks of polymerized monovinyl aromatic hydrocarbon having a weight average molecular weight of about 12,000 to about 40,000;
   c. B2 is a block of polymerized conjugated diene comprising at least 50 mole percent isoprene having an apparent molecular weight of from about 15,000 to about 60,000; and wherein;
   d. the weight ratio of B1 over B2 is from about 3.0 to about 12.0 and
   e. the content of polymerized monovinyl aromatic hydrocarbon is from 20 to about 35 weight percent.

26. An article selected from the group consisting of films, sheets, coatings, bands, strips, profiles, moldings, foams, tapes, fabrics, threads, filaments, ribbons, fibers, pluralities of fibers and fibrous webmoldings, said article being prepared from a formulation comprising:
   A. 100 parts by weight of a tetrablock copolymer and
   B. at least one other component selected from the group consisting of:
      i) 5 to 300 parts by weight of olefin polymers selected from the group consisting of ethylene homopolymers, ethylene/alpha olefin copolymers, propylene homopolymers, propylene/alpha olefin copolymers, high impact polypropylene, butylene homopolymers, butylene/alpha olefin copolymers, other alpha olefin copolymers or interpolymers ethylene/acrylic acid copolymers, ethylene/methacrylic acid ionomers, ethylene/vinyl alcohol copolymers, ethylene/cyclic olefin copolymers, propylene homopolymers and copolymers, propylene/syrene copolymers, ethylene/propylene copolymers, polybutylene, ethylene carbon monoxide interpolymers and ethylene/vinyl acetate copolymers, and
      ii) 5 to 200 parts by weight of styrene polymers selected from the group consisting of crystal polystyrene, high impact polystyrene, medium impact polystyrene, styrene/acrylonitrile copolymers, syndiotactic polystyrene, styrene/methyl-methacrylate copolymers, styrene/olefin copolymers selected from the group consisting of substantially random ethylene/ styrene copolymers and styrene-grafted polypropylene polymers, and acrylonitrile/butadiene/styrene terpolymer, and C. optionally one or more of the following components:
   i) tackifying resins,
   ii) polymer extending oils, and
   iii) engineering thermoplastic resins, wherein said tetrablock copolymer has the general formula: S1-B1-S2-B2 wherein S1, B1, S2, and B2 are polymer blocks, and
   a. B1 is a block of polymerized conjugated diene comprising at least 50 mole percent isoprene having an apparent molecular weight of from about 150,000 to about 400,000;
   b. S1 and S2 are blocks of polymerized monovinyl aromatic hydrocarbon having a weight average molecular weight of about 12,000 to about 40,000;
   c. B2 is a block of polymerized conjugated diene comprising at least 50 mole percent isoprene having an apparent molecular weight of from about 15,000 to about 60,000; and wherein;
   d. the weight ratio of B1 over B2 is from about 3.0 to about 12.0 and
   e. the content of polymerized monovinyl aromatic hydrocarbon is from 20 to about 35 weight percent.

27. The article according to claim 26 wherein said article is formed in a process selected from the group consisting of injection molding, over molding, dipping, extrusion, roto molding, fiber spinning, film making or foaming.

28. An article comprising:
A. 5 to 40 percent weight of a tetrablock copolymer and
B. 60 to 95 percent weight of at least one styrene polymer selected from the group consisting of crystal polystyrene, high impact polystyrene, medium impact polystyrene, styrene/acrylonitrile copolymers, syndiotactic polystyrene, styrene/methyl-methacrylate copolymers, styrene/olefin copolymers selected from the group consisting of substantially random ethylene/styrene copolymers and styrene-grafted polypropylene polymers, acrylonitrile/butadiene/styrene terpolymer and mixtures thereof,
C. and optionally, one or more other components selected from:
   i) tackifying resins,
   ii) polymer extending oils,
   iii) engineering thermoplastic resins, and
   iv) olefin polymers;

wherein said tetrablock copolymer has the general formula: S1-B1 -S2-B2 wherein S1, B1, S2, and B2 are polymer blocks, and
   a. B1 is a block of polymerized isoprene having greater than 99 mol percent isoprene and having an apparent molecular weight of from about 250,000 to 350,000;
   b. S1 and S2 are blocks of polymerized styrene blocks having greater than 99 mol percent styrene and apparent molecular weights of 20,000 to 35,000 for S1 and 20,000 to 35,000 for S2;
   c. B2 is a block of polymerized isoprene having greater than 99 mol percent isoprene and having an apparent molecular weight of from about 25,000 to about 50,000; and wherein;
   d. the weight ratio of B1 over B2 is from about 3.0 to about 12.0;
   e. the 3,4-configuration is between 5 mol percent and 20 mol percent; and
   f. the content of polymerized styrene is from 20 to about 35 weight percent.

29. The article according to claim 28 wherein said styrene polymer is crystal polystyrene or high impact polystyrene.

30. The article according to claim 28 wherein said styrene polymer is a styrene/methyl-methacrylate copolymer.

31. The article according to claim 28 wherein said styrene polymer is an acrylonitrile/butadiene/styrene terpolymer.

32. The article according to claim 28 comprising about 5 to 20 percent weight of said tetrablock copolymer and about 80 to about 95 percent weight of an engineering thermoplastic resin.

33. The article according to claim 32 wherein said engineering thermoplastic resin is selected from the group consisting of thermoplastic polyester, thermoplastic polyurethane, poly(arylether), poly(aryl sulfone), polycarbonate, acrylic resins, acetal resin, polyamide, halogenated thermoplastic, cyclic olefin copolymers, poly(methyl methacrylate) and nitrile barrier resin.

34. A formulated composition comprising 100 parts by weight of a tetrablock copolymer, at least one polymer selected from the group consisting of one or more olefin polymers selected from the group consisting of ethylene homopolymers, ethylene/alpha olefin copolymers, propylene homopolymers, propylene/alpha olefin copolymers, high impact polypropylene, butylene homopolymers, butylene/alpha olefin copolymers, other alpha olefin copolymers or interpolymers ethylene/acrylic acid copolymers, ethylene/methacrylic acid ionomers, ethylene/vinyl alcohol copolymers, ethylene/cyclic olefin copolymers, propylene homopolymers and copolymers, propylene/syrene copolymers, ethylene/propylene copolymers, polybutylene, ethylene carbon monoxide interpolymers and ethylene/vinyl acetate copolymers and one or more styrene polymers selected from the group consisting of crystal polystyrene, high impact polystyrene, medium impact polystyrene, styrene/acrylonitrile copolymers, syndiotactic polystyrene, styrene/methyl-methacrylate copolymers, styrene/olefin copolymers selected from the group consisting of substantially random ethylene/styrene copolymers and styrene-grafied polypropylene polymers, and acrylonitrile/butadiene/styrene terpolymer wherein when said one or more olefin polymers are present, they are present in an amount from about 5 to about 300 parts by weight and when said one or more styrene polymers are present, they are present in an amount from about 5 to about 200 parts by weight, and at least one component selected from the group consisting of fillers, reinforcements, polymer extending oils, tackifying resins, and lubricants, wherein said tetrablock copolymer has the general formula: S1-B1-S2-B2 wherein S1, B1, S2, and B2 are polymer blocks, and
   a. B1 is a block of polymerized conjugated diene comprising at least 50 mole percent isoprene having an apparent molecular weight of from about 150,000 to about 400,000;
   b. S1 and S2 are blocks of polymerized monovinyl aromatic hydrocarbon having a weight average molecular weight of about 12,000 to about 40,000;
   c. B2 is a block of polymerized conjugated diene comprising at least 50 mole percent isoprene having an apparent molecular weight of from about 15,000 to about 60,000; and wherein;
   d. the weight ratio of B1 over B2 is from about 3.0 to about 12.0 and the content of polymerized monovinyl aromatic hydrocarbon is from 20 to about 35 weight percent.

* * * * *